(12) United States Patent
Danilov et al.

(10) Patent No.: US 10,789,206 B2
(45) Date of Patent: Sep. 29, 2020

(54) SYSTEM AND METHOD FOR PARALLEL STORAGE TRANSFORMATION

(71) Applicant: EMC IP Holding Company LLC, Hopkinton, MA (US)

(72) Inventors: Mikhail Danilov, Saint Petersburg (RU); Nikita Gutsalov, Saint Petersburg (RU); Ivan Tchoub, Saint Petersburg (RU); Alexander Fedorov, Saint Petersburg (RU); Sergey Koyushev, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 348 days.

(21) Appl. No.: 15/638,330

(22) Filed: Jun. 29, 2017

(65) Prior Publication Data

US 2018/0181578 A1    Jun. 28, 2018

(30) Foreign Application Priority Data

Dec. 22, 2016 (RU) ................................ 2016150641

(51) Int. Cl.
| | | |
|---|---|---|
| G06F 16/11 | (2019.01) | |
| H04L 29/08 | (2006.01) | |
| G06F 16/21 | (2019.01) | |
| G06F 16/951 | (2019.01) | |
| G06F 16/242 | (2019.01) | |
| G06F 16/2453 | (2019.01) | |

(52) U.S. Cl.
CPC .......... *G06F 16/119* (2019.01); *G06F 16/128* (2019.01); *G06F 16/214* (2019.01); *G06F 16/2443* (2019.01); *G06F 16/2453* (2019.01); *G06F 16/951* (2019.01); *H04L 67/06* (2013.01); *H04L 67/1097* (2013.01)

(58) Field of Classification Search
CPC .... G06F 16/254; G06F 9/5066; G06F 9/5027; G06F 9/4881; G06F 9/5038; G06F 11/3006; G06F 11/3452; G06F 16/24544; G06F 16/24547; G06F 16/2474; G06F 9/46; G06F 11/226
See application file for complete search history.

(56) References Cited

U.S. PATENT DOCUMENTS

| | | | | |
|---|---|---|---|---|
| 8,874,477 | B2 * | 10/2014 | Hoffberg | G06Q 10/0631 705/37 |
| 2007/0043716 | A1 * | 2/2007 | Blewer | G06F 21/604 |
| 2007/0087756 | A1 * | 4/2007 | Hoffberg | G06Q 10/0631 455/450 |
| 2007/0287911 | A1 * | 12/2007 | Haid | G01C 21/16 600/429 |
| 2008/0017722 | A1 * | 1/2008 | Snyder | G06Q 10/00 235/494 |

(Continued)

*Primary Examiner* — Angelica Ruiz
(74) *Attorney, Agent, or Firm* — Womble Bond Dickinson (US) LLP

(57) ABSTRACT

A transformation service is provided for a plurality of transformation jobs associated with one or more storage containers. A single transformation user runs enumeration tasks associated with data stored in the one or more storage containers. When two or more of the plurality of transformation jobs are active during a time interval, the single transformation user runs an enumeration task for all of the active transformation jobs during said time interval.

18 Claims, 5 Drawing Sheets

(56) References Cited

U.S. PATENT DOCUMENTS

| | | | |
|---|---|---|---|
| 2008/0030764 A1* | 2/2008 | Zhu | G06F 9/5038 358/1.15 |
| 2008/0120129 A1* | 5/2008 | Seubert | G06Q 10/06 705/35 |
| 2009/0171999 A1* | 7/2009 | McColl | G06F 16/2465 |
| 2012/0042319 A1* | 2/2012 | Hildrum | G06F 9/4881 718/104 |
| 2013/0095864 A1* | 4/2013 | Marovets | H04W 4/14 455/466 |
| 2013/0179371 A1* | 7/2013 | Jain | G06F 9/5027 705/400 |
| 2015/0205693 A1* | 7/2015 | Seto | G06F 11/3065 702/186 |

* cited by examiner

SYSTEM AND METHOD FOR PARALLEL STORAGE TRANSFORMATION

CROSS-REFERENCE TO RELATED APPLICATIONS

This application claims priority under 35 U.S.C. § 119 to Russian Patent Application No. 2016150641, filed Dec. 22, 2016, which is incorporated herein by reference in its entirety.

FIELD

The disclosure herein relates generally to execution of storage transformation.

BACKGROUND

Data plays an important and central role in providing value to many businesses and organizations. Typically, new data storages support one or several existing data storage APIs (Application Program Interfaces) and provide some new value-added services. These services allow implementing a new range of solutions for the businesses and/or organizations. The businesses may prefer that the new solutions not only be applied to data stored in new data storages, but also be applied to data stored in old or legacy data storages. Conventionally, the data stored in a legacy data storage would be migrated to a new data storage. However, the businesses may be hesitant to abandon data storages that may be outdated. Also, migration can be a difficult process and take a very long time for large data storages, producing a high load on the storages.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In lieu of performing data storage migration, the inventors herein have found that the new solutions described above can be applied to existing data storages using storage transformation. For example, Elastic Cloud Storage (ECS) has a built-in transformation service that drives the process of storage transformation. This storage transformation method addresses challenges such as the difficulty in generating an object list for a large system, the slow speed of generating the object list and the high load this creates on the storage under transformation, and that a human typically must be involved in the process during for a long period of time. Also, the storage transformation may use standard features of high-end storages such as multiple users (e.g., profiles) within one storage, multiple containers (e.g., pools or buckets) within one storage, an access control list (ACL), and data query which is potentially an expensive operation.

In one embodiment, the storage transformation process may be performed as follows. A user creates a new transformation job by, for example, registering the storage under transformation as a transformation source. The transformation service connects to the storage under transformation and reads its configuration (e.g., users, containers, ACLs, etc.). The user chooses the containers for which content needs to be transformed. The transformation service uses the information provided to create a configuration subset within ECS (e.g., containers, users and ACLs affected, etc.). The ECS storage becomes a proxy for the storage under transformation. The applications that work with the storage under transformation are switched to the ECS storage use. The user starts the transformation job.

Figure 2:
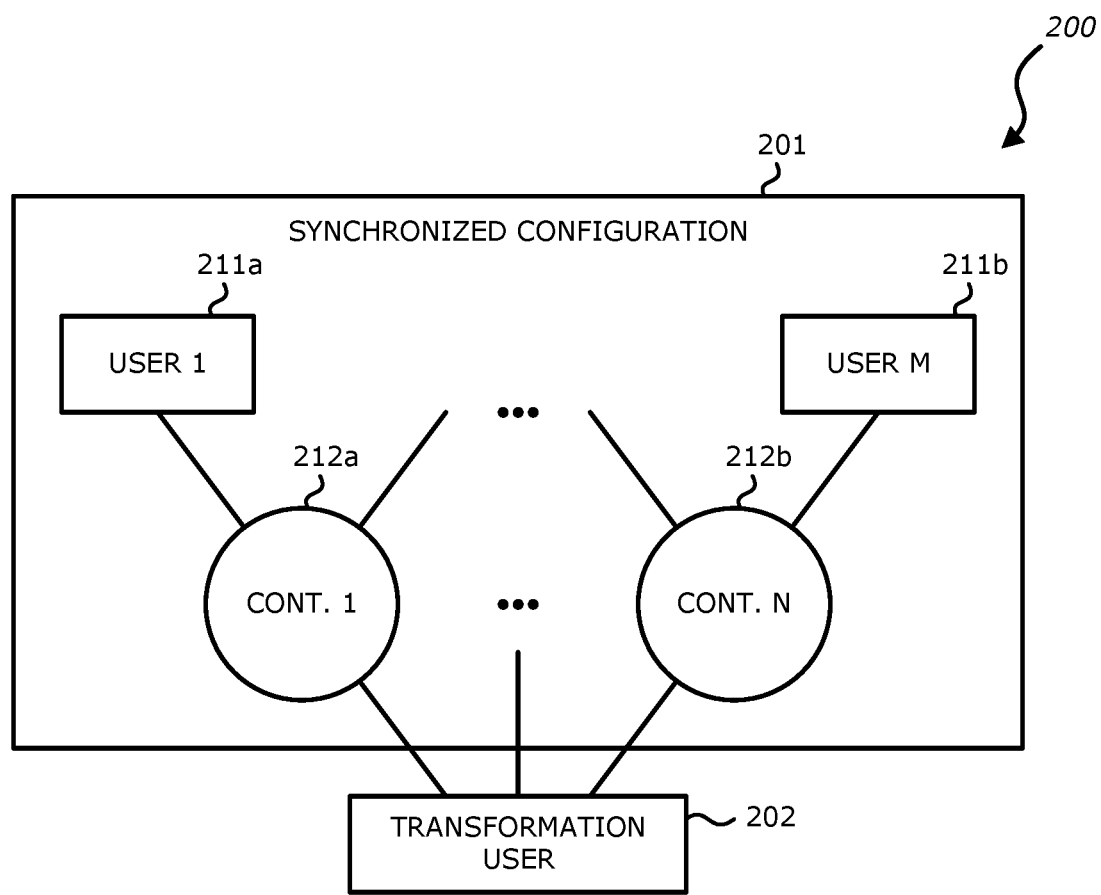
FIG. 2 is a block diagram for explaining an example transformation user used during parallel storage transformation according to an embodiment herein.

In one embodiment, the transformation service may create a dedicated transformation user within the storage under transformation to query all the containers to transform together. For example, as shown in FIG. 2, within a storage 200 transformation user 202 may be created to query containers 212a to 212b associated with users 211a to 211b included in synchronized configuration 201.

In one embodiment, the transformation may take a current time and use it as a transformation cutoff time. Objects created before that time may be subject for transformation. The transformation service splits the query time interval, which starts from the moment the oldest object came to the storage under transformation and finishes at the cutoff moment, into a set of time intervals, for example, 1 day long each. The entire enumeration may be decomposed to the set of small enumeration tasks ordered by interval start time. In one aspect, the transformation service runs enumeration tasks from the set (e.g., several at a time). During enumeration, the transformation service may read metadata associated with each object and store it in the object index of ECS. The transformation process finishes after all the enumeration tasks are complete.

By virtue of the foregoing described transformation service, since a list of objects to transform is produced automatically, a user typically does not need to produce such a list which can provide ease of user operability. The transformation service can also automatically derive other related storage configurations and reproduce such within ECS. Also, using one storage user to enumerate all of the containers can assure resource efficiency by reducing overhead associated with data query. Furthermore, by splitting the enumeration time interval into small time intervals and performing parallel processing of these small time intervals by all ECS cluster nodes, it is possible to assure a high speed of transformation process. Finally, a transformation setup algorithm and use of a cutoff time can allow for full autonomy of the transformation process. In most cases, a human may be involved in transformation setup only.

Figure 1:
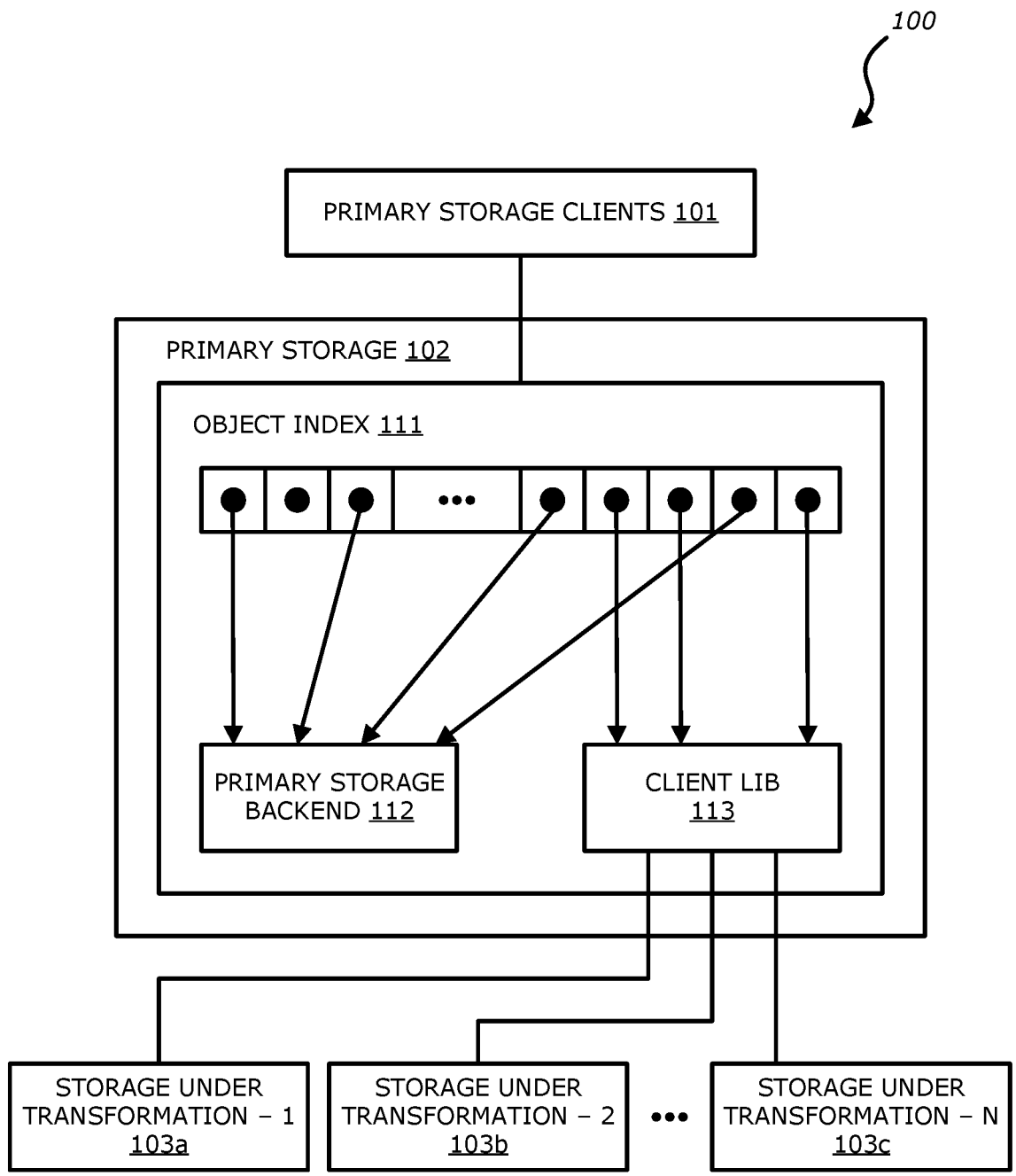
FIG. 1 is a block diagram for explaining an example system for performing parallel storage transformation according to an embodiment herein.

FIG. 1 is a block diagram showing an example transformation service 100 according to an embodiment herein. As a result of the transformation service described above, the new storage is primary storage 102 that handles all user traffic for primary storage clients 101. The primary storage 102 maintains index of all the objects stored within the transformed system in an object index 111. Some objects are stored in storage backend 112 of the primary storage 102. Some objects reside in the storage under transformation (e.g., storage under transformation 103a). Additional metadata field in the index may indicate an actual location of an object. When some application retrieves an object that belongs to the storage under transformation 103a, the primary storage 102 reads the object from the storage under transformation 103a using client library 113 and sends the object back to the application as if it was stored in the primary storage 102. As a result, all of the objects in the transformed system are viewed as equal from an application and value-added services point of view. In particular, applications can access legacy data as if it was migrated and this result can be achieved without actual data move.

In performing the transformation service, the inventors herein have recognized that there may be situation in which it is desirable to run multiple transformations for a single pair primary storage/storage under transformation. In particular, two example use cases for parallel transformation are as follows: a) splitting up content of a storage under transformation and having it in two or more ECS namespaces; and b) performing transformation in several phases (e.g., starting transformation for some group of containers first, then after some time, start transformation for another group), where different phases may overlap in time.

With respect to performing parallel storage transformation, the inventors herein have found a number of difficulties. For example, having N transformation jobs can increase the number of enumeration tasks to perform by N. This can impact duration of the transformation jobs. Also, difficulties can arise in load balancing between the N transformation jobs. Moreover, if two or more transformation jobs have intersecting sets of containers to transform, which can be a valid use case, then there is a scope of work that needs to be performed two or more times which is duplicative.

In one embodiment, a system for parallel storage transformation (illustrated, for example, in FIG. 1) is provided which addresses the difficulties described above. In particular, in this embodiment, a transformation service is performed for multiple transformation jobs (e.g., storages under transformation 103a to 103c) associated with one or more storage containers (e.g., storages under transformation 103a to 103c or containers included in storages 103a to 103c), and enumeration tasks associated with data stored in the one or more storage containers are run by a single transformation user (e.g., transformation user 202). When two or more of the plurality of transformation jobs are active during a time interval, the single transformation user runs an enumeration task for all of the active transformation jobs during the time interval.

In one embodiment, in performing the parallel storage transformation, a carousel can be created on which several transformation jobs can ride. The built-in transformation service can be responsible for maintenance of this carousel. An example carousel is described in more detail below in connection with FIG. 3.

In one aspect, a transformation job is active when it has been started and has not finished yet. Also, a transformation job is pending when it has been created but has not started yet.

In one embodiment, all active transformation jobs are tied together with a single transformation user. For example, one transformation user can be shared by all active transformations.

In one embodiment, when a user starts a transformation job, the transformation service creates a transformation user if there are no other active jobs, and grants the transformation user rights to query content for all the containers to transform for this job. When a transformation job finishes, the transformation service revokes rights to query content for all unique containers to transform for this job. The transformation user may still have rights for containers that the job shared with other transformation jobs. Alternatively, the transformation service may simply delete the transformation user if there are no other active jobs.

In one embodiment, when the transformation service runs an enumeration task for some time interval, the transformation service runs the enumeration task for all active jobs. The query results may belong to several jobs. The transformation service may use information about a home container ID of the object returned to identify the jobs concerned. There may be several jobs concerned if there are containers shared by jobs. Pairs (e.g., job, container ID) can be used to identify target containers for the object. Then the transformation service may read metadata associated with the object and store the metadata in the object index for all of the target containers of ECS N times, where N is the number of target containers identified for the object.

Figure 3:
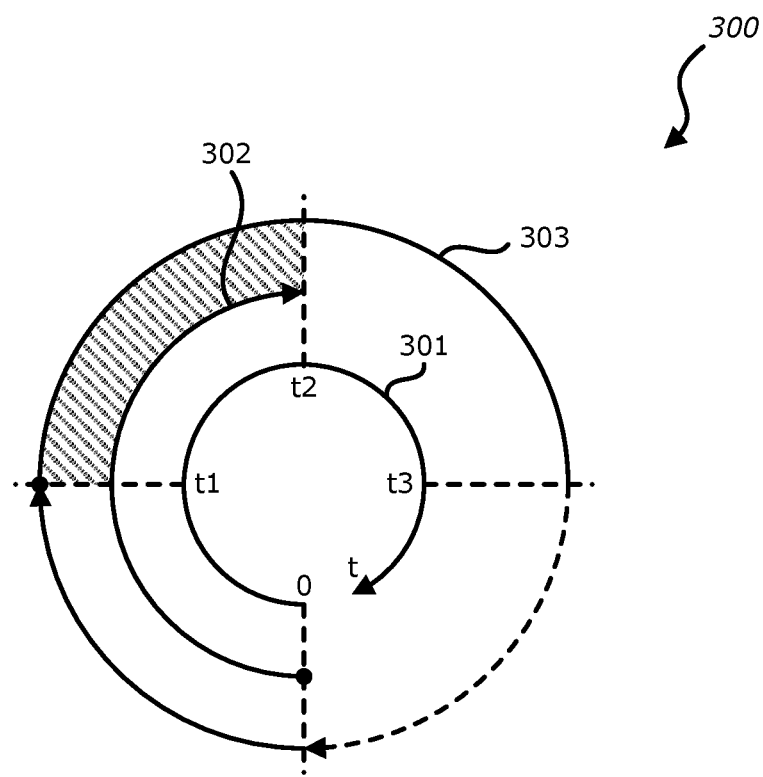
FIG. 3 is diagram for explaining an example transformation carousel used during parallel storage transformation according to an embodiment herein.

FIG. 3 shows a diagram for explaining an example transformation carousel 300 used during parallel storage transformation according to an embodiment herein. As shown in FIG. 3, in an example, a first transformation job 302 starts at a moment t2 along a time axis 301 including times 0 (zero), t1, t2 and t3. t2 is a cutoff time for the first transformation job 302. This job is to process all the objects created in the time interval between 0 (zero) and t2, and is the only active job until the moment t3. The transformation user is created and mapped to the containers listed for the first transformation job 302. All enumeration tasks return results for these containers only. At the moment t3, the second transformation job 303 starts. t3 is a cutoff time for the second transformation job 303. This job is to process all the objects created in the time interval between 0 (zero) and t3. The transformation service grants the transformation user rights to work with the containers listed for the second transformation job 303 as well. By this time, the transformation service has already executed multiple enumeration tasks for the first transformation job 302. These are tasks in the time interval between 0 and t1. Therefore, the second job 303 gets on the carousel 300 at the moment t1. All the enumeration tasks in the time interval between t1 and t2 are executed for both the first and second transformation jobs 302, 303. When the carousel 300 reaches the point t2, the first transformation job 302 finishes so the second transformation job 303 is to ride the carousel 300 further alone. The transformation service revokes rights to work with those containers listed for the first transformation job 302, which are not listed for the second transformation job 303. From this moment, the transformation user is mapped only to the containers listed for the second transformation job 303. All enumeration tasks return results for these containers only. The carousel 300 turns from t2 to t3 and jumps to the moment 0 again because objects created between the moments 0 and t1 have not yet been processed for the second transformation job 303. At the moment t1, the second transformation job 303 finishes and exits the transformation carousel 300, and the transformation user is deleted.

By virtue of the foregoing described carousel 300, when two or more transformation jobs overlap in time, they can share individual enumeration tasks. Thus, the number of enumeration tasks to execute does not increase. Also, since the enumeration tasks are shared, any load balancing problems between the active jobs is obviated. Finally, when two or more transformation jobs have intersecting sets of containers to transform, objects from these containers can be handled (listing and metadata read) just once.

Note that some or all of the components as shown and described above (e.g., primary storage clients 101, primary storage 102, and storages under transformation 103a-103c of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
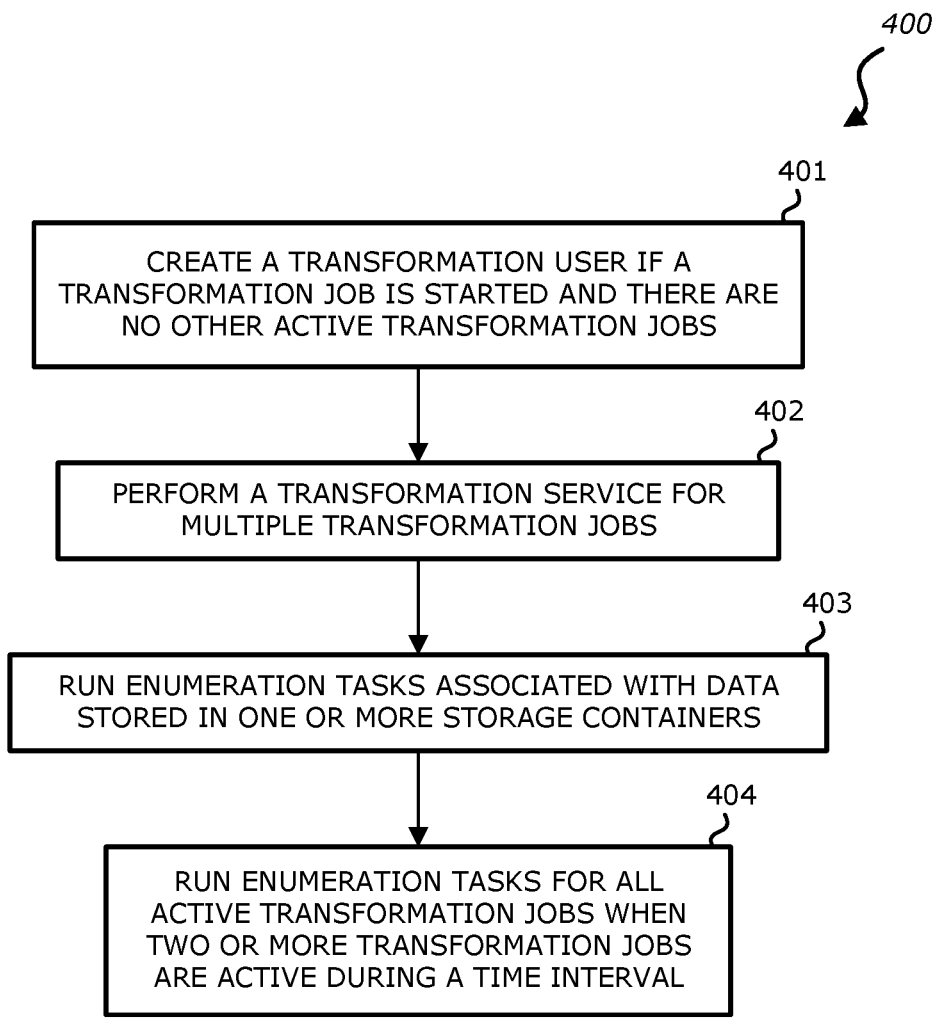
FIG. 4 is a flow diagram for explaining an example method for performing parallel storage transformation according to an embodiment herein.

FIG. 4 illustrates a flow diagram for explaining an example process for storage transformation according to an embodiment herein. In this regard, the following embodiments may be described as a process 400, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 400 may be performed by processing logic that includes hardware (e.g. circuitry, dedicated logic, etc.), software (e.g., embodied on a non-transitory computer readable medium), or a combination thereof.

Referring to FIG. 4, at block 401, a single transformation user (e.g., transformation user 202 of FIG. 2) is created when a transformation job (e.g., transformation job 302 or transformation job 303) is started for a storage under transformation and there are no other active transformation jobs. The transformation user is granted rights to query content for all of the storage containers necessary for transforming the transformation job.

At block 402, a transformation service is performed for multiple transformation jobs associated with one or more storage containers (e.g., storage containers 103a-103c). In some embodiments, the one or more storage containers may be included in one storage. In other embodiments, the one or more storage containers may be included in multiple storages.

At block 403, the single transformation user runs enumeration tasks associated with data stored in the one or more storage containers.

At block 404, when two or more of the transformation jobs are active during a time interval (as described, for example, with respect to FIG. 3), the single transformation user runs an enumeration task for all of the active transformation jobs during the time interval. When one of the transformation jobs is finished for a storage under transformation, and if there are unique storage containers to transform for the one transformation job, the rights to query content for all unique containers to transform for the one transformation job are revoked. Here, the transformation user maintains rights for storage containers of the one transformation job shared with other transformation jobs. When the transformation job is finished for a storage under transformation, and if there are no other transformation jobs that are active, the transformation user is deleted.

In one aspect, each run enumeration task results in an object with related information regarding a container identification identifying the transformation jobs concerned with the object. The container identification and identified jobs identify target containers for the object, and metadata associated with the object is read and stored in an object index (e.g., object index 111 of FIG. 1) a number of N times. N is the number of identified target containers.

In one aspect, the transformation user runs an enumeration task unique to one or more storage containers of a first transformation job (e.g., transformation job 302) during a first time interval (e.g., 0 to t1), the transformation user runs an enumeration task unique to one or more storage containers of a second transformation job (e.g., transformation job 303) during a second time interval (e.g., t2 to t3), and the transformation user runs an enumeration task for one or more storage containers of both the first and second transformation jobs during a third time interval (t1 to t2) in which both the first and second transformation jobs are active.

Figure 5:
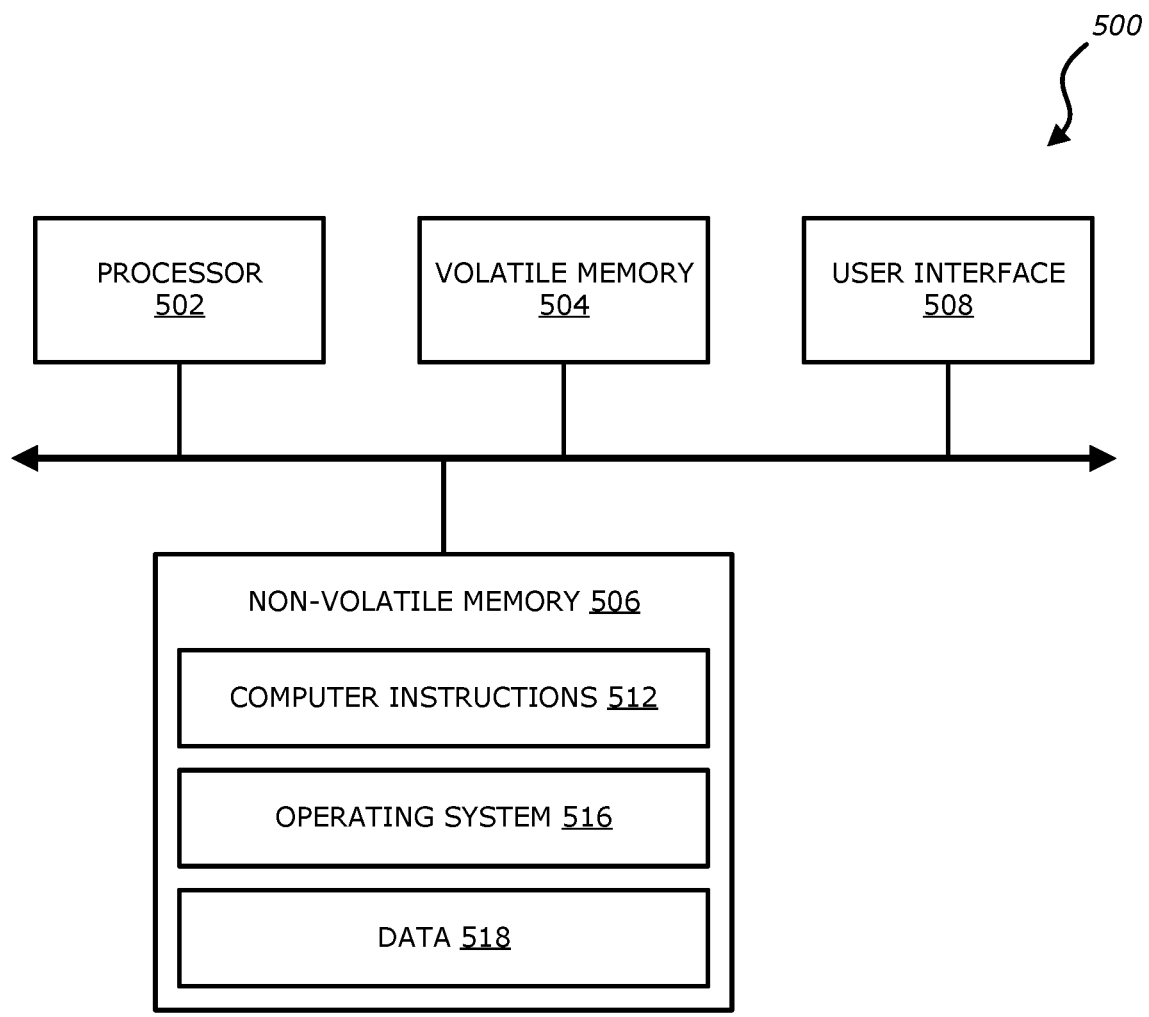
FIG. 5 is a block diagram for explaining an example data processing system on which any portion of the process of FIG. 2 may be implemented according to an embodiment herein.

FIG. 5 illustrates a block diagram of an example of a data processing system which may be used with one embodiment herein. For example, system 520 may represent any of data processing systems described above performing any of the processes or methods described above. System 520 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 520 is intended to show a high level view of many components of the computer system. However, it is to be understood that additional components may be present in certain implementations and furthermore, different arrangement of the components shown may occur in other implementations. System 520 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 520 includes a processor 502, a volatile memory 504, a non-volatile memory 506 (e.g., hard disk) and a user interface (UI) 508 (e.g., a graphical user interface, a mouse, a touch pad, a touch sensitive screen, a display, a pointer device such as a stylus, a keyboard, and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400). In addition, executable code and/or data of a variety of operating systems, device drivers, firmware (e.g., input output basic system or BIOS), and/or applications can be loaded in the memory and executed by processor 502.

In one embodiment, system 520 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 520.

To provide for persistent storage of information such as data, applications, one or more operating systems and so forth, a mass storage (not shown) may also couple to processor 502. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 502, e.g., via a serial peripheral interface (SPI). This flash device may provide for non-volatile storage of system software, including a basic input/output software (BIOS) as well as other firmware of the system.

Processor 502 may represent a single processor or multiple processors with a single processor core or multiple processor cores included therein. Processor 502 may represent one or more general-purpose processors such as a microprocessor, a central processing unit (CPU), or the like. More particularly, processor 502 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 502 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 502, which may be a low power multi-core processor socket such as an ultra-low voltage processor, may act as a main processing unit and central hub for communication with the various components of the system. Such processor can be implemented as a system on chip (SoC).

According to one example embodiment, primary storage 102, object index 111, primary storage backend 112, and client lib 113 are stored in non-volatile memory 506 and are executed by the processor 502 to cause system 520 to function in accordance with the techniques discussed herein.

FIG. 5 is merely one example of a particular implementation and is merely intended to illustrate the types of components that may be present in the system 520. Note that while system 520 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 400 can be implemented in any combination hardware devices and software components.

Embodiments of the present invention are not described with reference to any particular programming language. It will be appreciated that a variety of programming languages may be used to implement the teachings of embodiments of the invention as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method comprising:
    performing a transformation service for a plurality of transformation jobs associated with one or more storage containers; and
    running, by a single transformation user, enumeration tasks associated with data stored in the one or more storage containers, wherein the single transformation user is created when a first transformation job of the plurality of transformation jobs starts, and wherein the single transformation user is granted rights to query content for the one or more storage containers necessary for transforming the plurality of transformation jobs,
    wherein, when two or more of the plurality of transformation jobs are active during a time interval, the single transformation user runs an enumeration task for all of the active transformation jobs during said time interval, and wherein the enumeration task is shared among the active transformation jobs during the time interval.

2. The method of claim 1 further comprising:
    when one of the transformation jobs is started for a storage under transformation, creating the transformation user if there are no other active transformation jobs, and granting the transformation user rights to query content for all of the storage containers necessary for transforming the one transformation job.

3. The method of claim 1 further comprising:
    when one of the plurality of transformation jobs is finished for a storage under transformation, and if there are unique storage containers to transform for the one transformation job, revoking the rights to query content for all unique containers to transform for the one transformation job, wherein the transformation user maintains rights for storage containers of the one transformation job shared with other transformation jobs.

4. The method of claim 1 wherein when the transformation job is finished for a storage under transformation, and if there are no other transformation jobs that are active, the method further comprises deleting the transformation user.

5. The method of claim 1 wherein each run enumeration task results in an object with related information regarding a container identification identifying the transformation jobs concerned with the object, and the container identification and identified jobs identify target containers for the object, and wherein metadata associated with the object is read and stored in an object index a number of N times, N being the number of identified target containers.

6. The method of claim 1 wherein the transformation user runs an enumeration task unique to one or more storage containers of a first transformation job during a first time interval, the transformation user runs an enumeration task unique to one or more storage containers of a second transformation job during a second time interval, and the transformation user runs an enumeration task for one or more storage containers of both the first and second transformation jobs during a third time interval in which both the first and second transformation jobs are active.

7. A data processing system comprising:
electronic hardware circuitry constructed to:
perform a transformation service for a plurality of transformation jobs associated with one or more storage containers; and
run, by a single transformation user, enumeration tasks associated with data stored in the one or more storage containers, wherein the single transformation user is created when a first transformation job of the plurality of transformation jobs starts, and wherein the single transformation user is granted rights to query content for the one or more storage containers necessary for transforming the plurality of transformation jobs,
wherein, when two or more of the plurality of transformation jobs are active during a time interval, the single transformation user runs an enumeration task for all of the active transformation jobs during said time interval, and wherein the enumeration task is shared among the active transformation jobs during the time interval.

8. The data processing system of claim 7 wherein the electronic hardware circuitry is further constructed to:
when one of the transformation jobs is started for a storage under transformation, create the transformation user if there are no other active transformation jobs, and grant the transformation user rights to query content for all of the storage containers necessary for transforming the one transformation job.

9. The data processing system of claim 7 wherein the electronic hardware circuitry is further constructed to:
when one of the plurality of transformation jobs is finished for a storage under transformation, and if there are unique storage containers to transform for the one transformation job, revoke the rights to query content for all unique containers to transform for the one transformation job, wherein the transformation user maintains rights for storage containers of the one transformation job shared with other transformation jobs.

10. The data processing system of claim 7 wherein when the transformation job is finished for a storage under transformation, and if there are no other transformation jobs that are active, the electronic hardware circuitry is further constructed to delete the transformation user.

11. The data processing system of claim 7 wherein each run enumeration task results in an object with related information regarding a container identification identifying the transformation jobs concerned with the object, and the container identification and identified jobs identify target containers for the object, and wherein metadata associated with the object is read and stored in an object index a number of N times, N being the number of identified target containers.

12. The data processing system of claim 7 wherein the transformation user runs an enumeration task unique to one or more storage containers of a first transformation job during a first time interval, the transformation user runs an enumeration task unique to one or more storage containers of a second transformation job during a second time interval, and the transformation user runs an enumeration task for one or more storage containers of both the first and second transformation jobs during a third time interval in which both the first and second transformation jobs are active.

13. A non-transitory computer-readable storage medium storing computer-executable instructions, the instructions causing a machine to execute a process comprising:
performing a transformation service for a plurality of transformation jobs associated with one or more storage containers; and
running, by a single transformation user, enumeration tasks associated with data stored in the one or more storage containers, wherein the single transformation user is created when a first transformation job of the plurality of transformation jobs starts, and wherein the single transformation user is granted rights to query content for the one or more storage containers necessary for transforming the plurality of transformation jobs,
wherein, when two or more of the plurality of transformation jobs are active during a time interval, the single transformation user runs an enumeration task for all of the active transformation jobs during said time interval, and wherein the enumeration task is shared among the active transformation jobs during the time interval.

14. The non-transitory computer-readable storage medium of claim 13 wherein the process further comprises:
when one of the transformation jobs is started for a storage under transformation, creating the transformation user if there are no other active transformation jobs, and granting the transformation user rights to query content for all of the storage containers necessary for transforming the one transformation job.

15. The non-transitory computer-readable storage medium of claim 13 wherein the process further comprises:
when one of the plurality of transformation jobs is finished for a storage under transformation, and if there are unique storage containers to transform for the one transformation job, revoking the rights to query content for all unique containers to transform for the one transformation job, wherein the transformation user maintains rights for storage containers of the one transformation job shared with other transformation jobs.

16. The non-transitory computer-readable storage medium of claim 13 wherein when the transformation job is finished for a storage under transformation, and if there are no other transformation jobs that are active, the process further comprises deleting the transformation user.

17. The non-transitory computer-readable storage medium of claim 13 wherein each run enumeration task results in an object with related information regarding a container identification identifying the transformation jobs concerned with the object, and the container identification and identified jobs identify target containers for the object, and wherein metadata associated with the object is read and stored in an object index a number of N times, N being the number of identified target containers.

18. The non-transitory computer-readable storage medium of claim 13 wherein the transformation user runs an enumeration task unique to one or more storage containers of a first transformation job during a first time interval, the transformation user runs an enumeration task unique to one or more storage containers of a second transformation job during a second time interval, and the transformation user runs an enumeration task for one or more storage containers of both the first and second transformation jobs during a third time interval in which both the first and second transformation jobs are active.

\* \* \* \* \*